United States Patent
Rei et al.

(10) Patent No.: US 7,723,258 B2
(45) Date of Patent: May 25, 2010

(54) METHOD AND SUBSTANCE FOR REACTIVE CATALYTIC COMBUSTION

(75) Inventors: Min-Hon Rei, Taipei (TW); Hang-Fu Wang, Taipei County (TW)

(73) Assignee: Green Hydrotec Corp., Taipei (TW)

(*) Notice: Subject to any disclaimer, the term of this patent is extended or adjusted under 35 U.S.C. 154(b) by 592 days.

(21) Appl. No.: 11/314,146

(22) Filed: Dec. 20, 2005

(65) Prior Publication Data

US 2006/0111236 A1    May 25, 2006

Related U.S. Application Data

(63) Continuation-in-part of application No. 10/675,731, filed on Sep. 29, 2003, now abandoned, which is a continuation-in-part of application No. 10/287,991, filed on Nov. 4, 2002, now Pat. No. 6,699,815, which is a continuation-in-part of application No. 09/777,488, filed on Feb. 5, 2001, now abandoned.

(30) Foreign Application Priority Data

Jun. 21, 2000    (TW) ............................... 89112230 A

(51) Int. Cl.
| | |
|---|---|
| *B01J 21/02* | (2006.01) |
| *B01J 8/02* | (2006.01) |
| *B01J 8/00* | (2006.01) |
| *B01D 53/56* | (2006.01) |
| *B01D 53/94* | (2006.01) |
| *B01D 53/72* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |
| *C07C 11/24* | (2006.01) |

(52) U.S. Cl. .................... 502/202; 502/207; 423/213.5; 423/245.3

(58) Field of Classification Search ................. 502/202, 502/207; 423/213.5, 246.3
See application file for complete search history.

(56) References Cited

U.S. PATENT DOCUMENTS 3,117,096 A * 1/1964 Harris et al. ................ 502/200

(Continued)

FOREIGN PATENT DOCUMENTS

| EP | 1 391 428 A1 | 2/2004 |
|---|---|---|
| JP | 54-009694 | 1/1979 |
| JP | 02-166305 A | 6/1990 |
| JP | 2002-018288 A | 1/2002 |

OTHER PUBLICATIONS

ChemBlink Chemical Database info for Methanol and Dimethyl Formamide (2 sheets).*

(Continued)

*Primary Examiner*—Patricia L Hailey

(57) ABSTRACT

A process of a catalytic combustion is disclosed. The process can be started at a cold temperature and then raised to a desired high temperature in a very short time by employing a noble metal catalyst dispersed on a supporting material. Moreover, a method for dispersing a noble metal catalyst used in the catalytic combustion is also disclosed for increasing a specific surface area of the catalyst so as to facilitate the catalytic combustion. Furthermore, a substance including a promoter dispersing a metal catalyst therewith, and a supporting material supporting the promoter with the metal catalyst is also disclosed, so that a contact surface area of the metal catalyst can be increased, thereby the catalytic combustion can be initiated within a very short period.

17 Claims, 7 Drawing Sheets

U.S. PATENT DOCUMENTS

| | | |
|---|---|---|
| 4,045,369 A | 8/1977 | Cantaluppi |
| 4,122,671 A | 10/1978 | Armstrong et al. |
| 4,163,736 A | 8/1979 | Acres et al. |
| 4,897,253 A | 1/1990 | Jenkins |
| 5,928,984 A | 7/1999 | von Hippel et al. |
| 5,969,166 A | 10/1999 | Scharbert et al. |
| 6,034,270 A | 3/2000 | Borchert et al. |
| 6,048,512 A | 4/2000 | von Hippel et al. |
| 6,764,668 B2 | 7/2004 | Jacobsen |
| 7,025,944 B2 * | 4/2006 | Nielsen et al. ............... 423/362 |
| 7,252,692 B2 * | 8/2007 | Rei ................................ 48/61 |
| 2003/0078158 A1 | 4/2003 | Rei et al. |
| 2004/0057891 A1 | 3/2004 | Nielsen et al. |

OTHER PUBLICATIONS

Wu et al.: A Novel Boron Nitride Supported Pt Catalyst for VOC Incineration, 2001 Elsevier Science, pp. 117-124.

Wu et al.: Deep Oxidation of Methanol Using a Novel Pt/Boron Nitride Catalyst, 2003 American Chemical Society, pp. 3225-3229.

* cited by examiner

A : Metering Pump
B : Thermal Couple
C : Temperature Indictor
D : Furnace
E : PID Controller
F : Tubular Reactor (ID=1/2")
G : Pressure Regulator
H : Sampling Valve
I : Computer (Integrator)
J : Vent Scrubber
K : Heating Tape

METHOD AND SUBSTANCE FOR REACTIVE CATALYTIC COMBUSTION

FIELD OF THE INVENTION

This is a continuation-in-part application of U.S. patent application Ser. No. 10/675,731 filed on Sep. 29, 2003, which is a continuation-in-part application of U.S. patent application Ser. No. 10/287,991 filed on Nov. 4, 2002. This invention relates to a method and a substance for a catalytic combustion, and more particularly to a method and a substance for rapidly catalyzing a combustion reaction.

BACKGROUND OF THE INVENTION

Vapor phase combustion at high temperature is notorious for generating a nitrogen oxide, $NO_x$, which always causes a noxious pollution hazard. Furthermore, during the vapor phase combustion, a large portion of the thermal energy is lost through the chimney effect. On the other hand, a catalytic oxidation is a much cleaner type of combustion without yielding nitrogen oxides. However, the catalytic oxidation generally takes a long induction period to initiate the reaction until its exothermic reaction heat can provide enough activation energy to sustain its continuous auto-oxidation. Thus, it often needs to preheat the fuel to a high temperature for shortening the induction period thereof. As a result, the catalytic oxidation reaction is difficult to be used as a heating method for supplying heat to an industrial reactor or facilities due to the fact that the conventional oxidation catalyst is not reactive enough to increase the temperature of the fuel from the ambient temperature to the desired high temperature in a very short period of time, for example, 10 to 30 minutes.

Consequently, it will need a reactive oxidation catalyst capable of being heated up from the room temperature to the desired high temperature in a very short time, for example, 10 to 30 minutes, so that the catalytic oxidation catalyst can be used for an industrial reactor or facilities. That means the catalyst must be able to start a reactor to its desired reaction temperature in a short period of time without external heating source or facility.

Because the defects in the prior art and the demands for a future application of the catalytic combustion, the present invention discloses a method and a substance for rapidly catalyzing the combustion in a short time. Therefore, the combustion can be completed in a rapid and clean way.

SUMMARY OF THE INVENTION

In accordance with an aspect of the present invention, a substance for a catalytic combustion is provided. The substance includes a noble metal, an inorganic combustion promoter mixing with the noble metal and performing at least one of water-repellence and heat conduction and a supporting material dispersing the noble metal with the inorganic combustion promoter thereon for increasing a total contacting surface area of the noble metal.

Preferably, the inorganic combustion promoter is a boron nitride.

Preferably, the noble metal is one selected from the group consisting of platinum (Pt), palladium (Pd), rhodium (Rh), Ruthenium (Ru) and a mixture thereof.

Preferably, the noble metal is mixed with the inorganic combustion promoter to form a catalytic composition.

Preferably, the supporting material is a porous material having relatively higher specific surface area and pore volume for facilitating the catalyst combustion.

Preferably, the supporting material is one selected from the group consisting of γ-alumina, titania, zirconia, silica and other industrial oxidation catalyst itself.

Preferably, a specific surface area of the substance is ranged from 1 to 200 m2/g.

Preferably, a loading of the noble metal to the inorganic combustion promoter is ranged from 0.01% to 5.0% by weight.

Preferably, the catalytic combustion is the combustion of a fuel.

Preferably, the fuel is one selected from the group consisting of hydrogen, a dimethyl formamide, a mixture of water and alcohol and a single alcohol.

Preferably, the alcohol is one selected from the group consisting of a methanol, an ethanol and an isopropanol.

Preferably, the fuel is one of a mixture of hydrocarbon and alcohol and a single hydrocarbon.

Preferably, the hydrocarbon is one selected from the group consisting of a methane, a liquid petroleum gas (LPG), a gasoline, a hexane and a naphtha oil.

Preferably, the catalytic combustion is performed in a temperature ranged from 5° C. to 1000° C.

In accordance with another respect of the present application, a use of the provided substance is also provided.

In accordance with further respect of the present application, a method for fabricating the provided substance is also provided.

In a further respect of the present application, a substance for a catalytic combustion of a fuel is provided. The substance includes a noble metal, an inorganic combustion promoter dispersing the noble metal and performing at least one of hydrophobicity and heat conduction and a supporting material dispersing the noble metal with the inorganic combustion promoter thereon for increasing a contact surface area of the noble metal, thereby the catalytic combustion being initiated within 30 minutes.

Preferably, the inorganic combustion promoter is a boron nitride.

Preferably, the supporting material is a porous material having relatively higher specific surface area and pore volume for facilitating the catalyst combustion.

Preferably, the fuel is one selected from the group consisting of hydrogen, a mixture of water and alcohol, a single alcohol, a mixture of hydrocarbon and alcohol and a single hydrocarbon.

The above objects and the advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
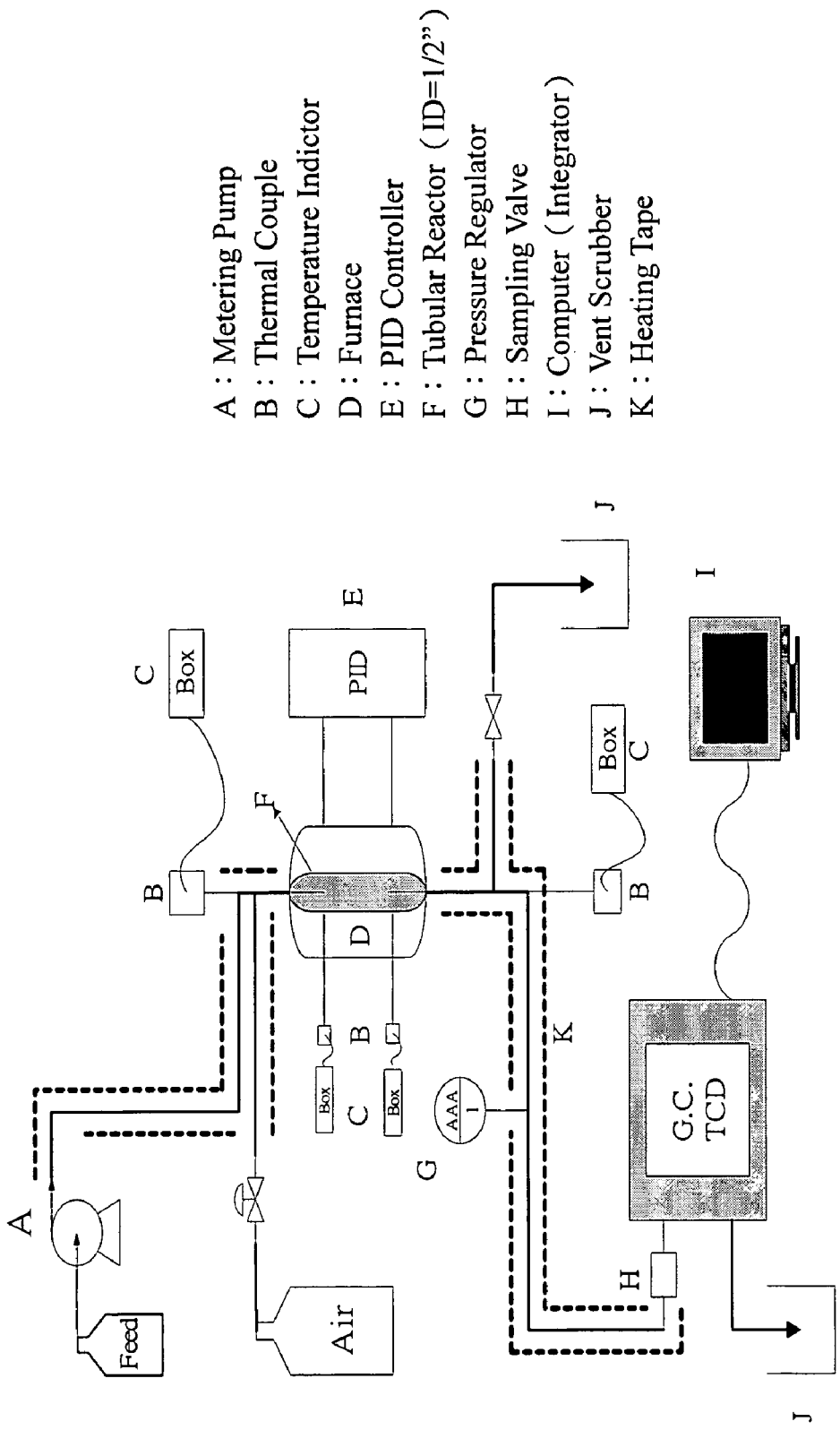
FIG. 1A is a schematic view showing a reactor system for the catalytic combustion according to the present invention.

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

The purpose of rapidly inducing a catalytic combustion according to the present invention is achieved by a supported noble metal catalyst, preferably a boron nitride (hBN) supported noble metal catalyst.

The advantages of using BN/support as a catalyst support for oxidation reaction are described below.

(a) The physical and chemical properties of the interface promoter (BN) on an inert support are stable at high temperature because of its high thermal stability.

(b) No hot spot will be developed from the exothermic oxidation reaction because of the high thermal conductivity of hBN. Thus, the clusters of noble metal, which is supported on the BN/support composite, won't be sintered during the reaction. The catalyst activity can be maintained for a longer period.

(c) The catalyst will not easily be damaged by acidic or basic agents because of the chemical inertness of hBN.

(d) Moisture cannot condense inside the pores of this interface hBN because of its hydrophobicity. Therefore, the surface of catalyst won't be covered by moisture to hinder the further catalytic reaction, and the oxidation activity is enhanced accordingly.

A BN-modified supported noble metal catalyst is used to completely oxidize organic compounds to water and carbon dioxide. hBN is a white flake-type powder compound in appearance which can be purchased on the commercial market. The noble metal is selected from a group consisting of platinum (Pt), palladium (Pd), rhodium (Rh), Ruthenium (Ru) and a mixture thereof, preferably Pt. The noble metal is dispersed on the surface of BN/support, and the loading is from 0.01 to 5.0 wt %. The specific surface area of hBN supported noble metal catalyst is from 1 to 200 $m^2/g$, preferably from 30 to 80 $m^2/g$.

The noble metal is dispersed on the surface of BN/support by the so called "incipient wetness technique". In order to make the noble metal more easily be soaked onto the hydrophobic BN support, an organic solvent of alcohols, preferably the methanol or dimethyl formamide (DMF), is chosen as the diluting solvent. The quantity of solvent required to completely fill the pore volume of support (BN) is predetermined.

A noble metal complex compound of Pt, Pd, Rh or Ru, preferably in hexachloride or its amine salt, e.g., $H_2PtCl_6.H_2O$, is dissolved in solvent to result in a metal-solvent suspension. Furthermore, a supporting material selected from the group consisting of γ-alumina, titania, zirconia, silica or other commercial oxidation catalyst might also be used in the present application for dispersing the noble metal with nBN.

For use in the catalytic combustion, this BN dispersed noble metal catalyst described above is uniquely designed and fabricated by the use of an active metal with hBN in a solvent of methanol or DMF forming a hydrophobic paste and thereafter this pasted noble metal catalyst is further dispersed on a stable high surface area supporting material, wherein this Pt-hBN paste functions as an interface substrate for facilitating the further dispersion of the catalyst onto the supporting material. Thus, through the high surface area supporting material, it will be easier for the catalyst to contact with the fuel so as to increase the reaction rate thereof. Hence, a porous supporting material, such as a γ-alumina or zirconia, might be a great solution which has a high surface area and also in a stable state. Additionally, the hydrophobic paste is chosen to reduce the chemisorption of water molecule and to prevent the water from competing an active catalyst site and blocking the chemisorption of the fuel molecule on the active metal. Moreover, this hydrophobic paste is an excellent thermal conductive material and is capable of dispersing the exothermal heat from the active metal site. Therefore, this design makes a rapid oxidation possible.

Example 1

Preparation of Supported Pt/BN Catalyst

One gram (1 g) of $H_2PtCl_6.6H_2O$ [Hexachloroplatinic acid hexahydrate, MWt=517.7, Pt:0.376 wt %] was dissolved in a small quantity of methanol to form a total volume of 12 cc. This solution is then added drop wise onto 10 g of h-boron nitride. The incipient dry mass was then heated at 70° C. to dry under an infrared lamp (250 W). It was then transferred into a steel reactor tube and heated at 300° C. with an air flow of 15 cc/min for 2 hr. The BET surface area of the catalyst was 49 $M^2/g$, and the Pt-loading was 3.7% wt

Example 2

Preparation of the Alumina Supported Pt/BN Catalyst

Five grams (5 g) of a stable porous supporting material in sizes of 8-16 mesh, such as γ-alumina, or an industrial oxidation catalyst itself was added with small volume of methanol equivalent to the pore volume of the support. Then, one gram (1 g) of the Pt/BN catalyst from Example 1, was suspended in 3 cc of methanol, and the paste was then dispersed onto the supporting material under a mild stirring with a glass rod. The mixture is first dried at 70° C. under an infrared lamp and then further heated to 300° C. under an air stream of 15 cc/min for two hours (2 hr). The BET surface area of this supported catalyst, PtBN/γ-$Al_2O_3$, was 170 $M^2/g$.

The same procedure was used to prepare a host of supported Pt/BN with zirconia and two commercial oxidation catalysts, N220 and DASH-220. The surface properties are shown in Table 1.

TABLE 1

Surface properties of supported Pt/BN catalysts

| Catalyst | Before oxidation reaction | | | 30 Hr after oxidation reaction | | |
|---|---|---|---|---|---|---|
| | BET area $M^2/g$ | Pore vol. cc/g | Pore size Å | BET area $M^2/g$ | Pore vol. cc/g | Pore size Å |
| Pt/BN | 39.4 | 0.16 | 165.3 | 37.9 | 0.18 | 191.8 |
| Pt/BN/γ-Alumina[a] | 169.4 | 0.45 | 107.3 | 144.4 | 0.42 | 116.2 |
| Pt/BN/DASH220[b] | 135.5 | 0.38 | 112.1 | 85.5 | 0.34 | 160.7 |
| Pt/BN/N220[c] | 126.5 | 0.34 | 117.4 | 100 | 0.36 | 142.1 |

[a]γ-Alumina was supplied from SASOL GermanGmbH and was a hollw tablet with 5 mm in outer diameter × 2.2 mm in inner diameter × 5 mm in length, SA 218 $M^2$/gm PV, 0.5 cc/gm of)
[b]DASH220 was from NE Chemcat Corp. (www.ne-chemcat.co.jp) and has a Pt content of 0.2 wt % on alumina with BET are of 150 $M^2$/g, pore vol. of 0.55 cc/g, and pore size of 119 Å.
[c]N220 was from Süd Chemie Catalyst Japan, Inc. (www.sued-chemie-japan.co.jp) and has a Pt content of 0.2 wt % on alumina with BET are of 150 $M^2$/g, pore vol. of 0.42 cc/g and pore size of 130 Å.

Example 3

Preparation of Supported PtBN/$ZrO_2$ Using Mixed Solvent of Methanol and DMF

Five grams (5 g) of zirconia tablet (Daiichi Kigenso Kagaku Co., RSC-HP grade, BET surface area, 56.2 $M^2$/gr, www.dkkk.co.jp, Osaka Japan, 81-6-6231-3835) in sizes of 2×3 mm, was added with small volume of DMF equivalent to the pore volume of the support. Then, one gram (1 g) of the above catalyst, Pt/BN, was suspended in 3 cc of mixed solvents containing 20% vol of DMF in methanol, and the paste was then dispersed onto zirconia support under a mild stirring with a glass rod. The mixture is first dried at 100° C. under an infrared lamp and then further heated to 450° C. under an air stream of 30 cc/min for two hours (2 hr). The final PtBN/$ZrO_2$ contained 0.18% wt of Pt metal and 4.8% wt of hBN promoter. Replacement of methanol with the mixed solvents of methanol and DMF results in a more homogeneous suspension and was easier to work. The same recipe and procedure was used to prepare PtBN/$Al_2O_3$.

Example 4

Preparation of the Ceramic Honeycomb Supported PtBN/Support Catalyst

Preparation of Pt-salt/h-BN in the mixed solvent described in Example 9 was followed except the 20% more mixed solvents were used to facilitate the washcoating in the ceramic honeycomb support (18 mm in outer diameter×20 mm in length) with 150 openings of 1.28 mm rectangular configuration. Approximately 0.040 gm of solid coating on 4.36 gm of the honeycomb support was obtained after calcinations.

Example 5

Cold Started Catalytic Combustion of Methanol with Pt/BN/Support

Figure 1B:
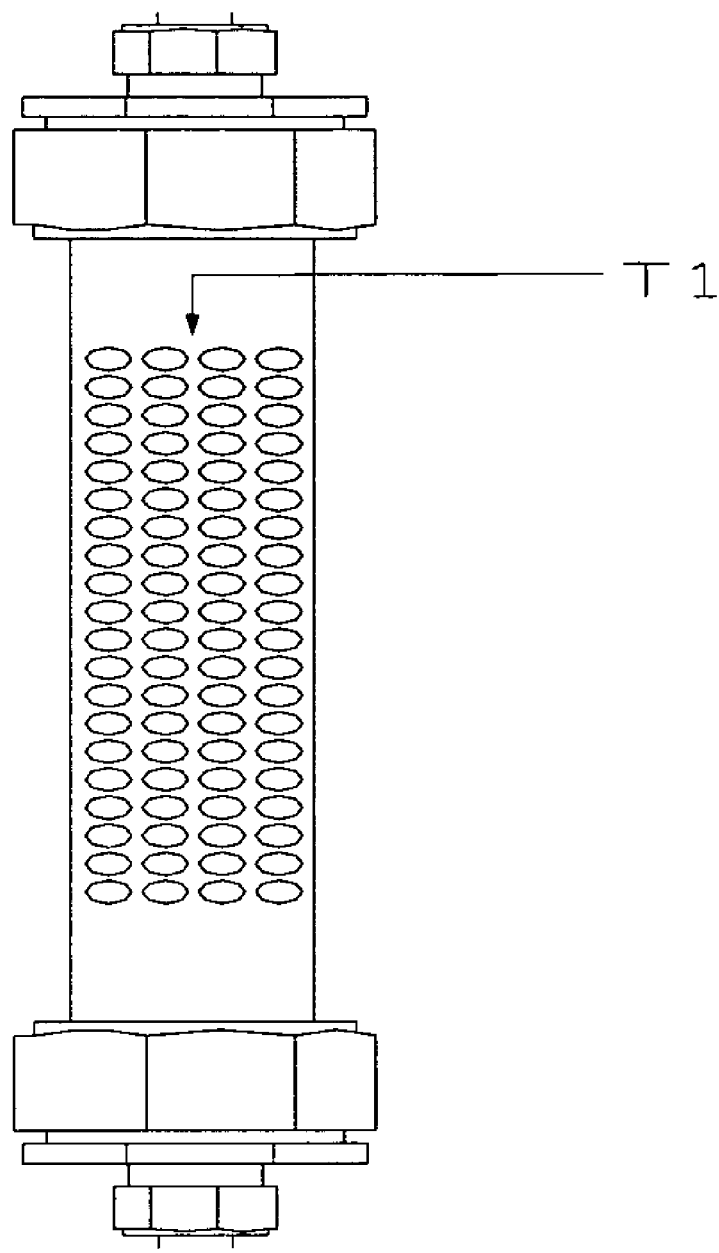
FIG. 1B is a sectional drawing showing a catalytic bed of the reactor in FIG. 1A according to the present invention.
Figure 2:
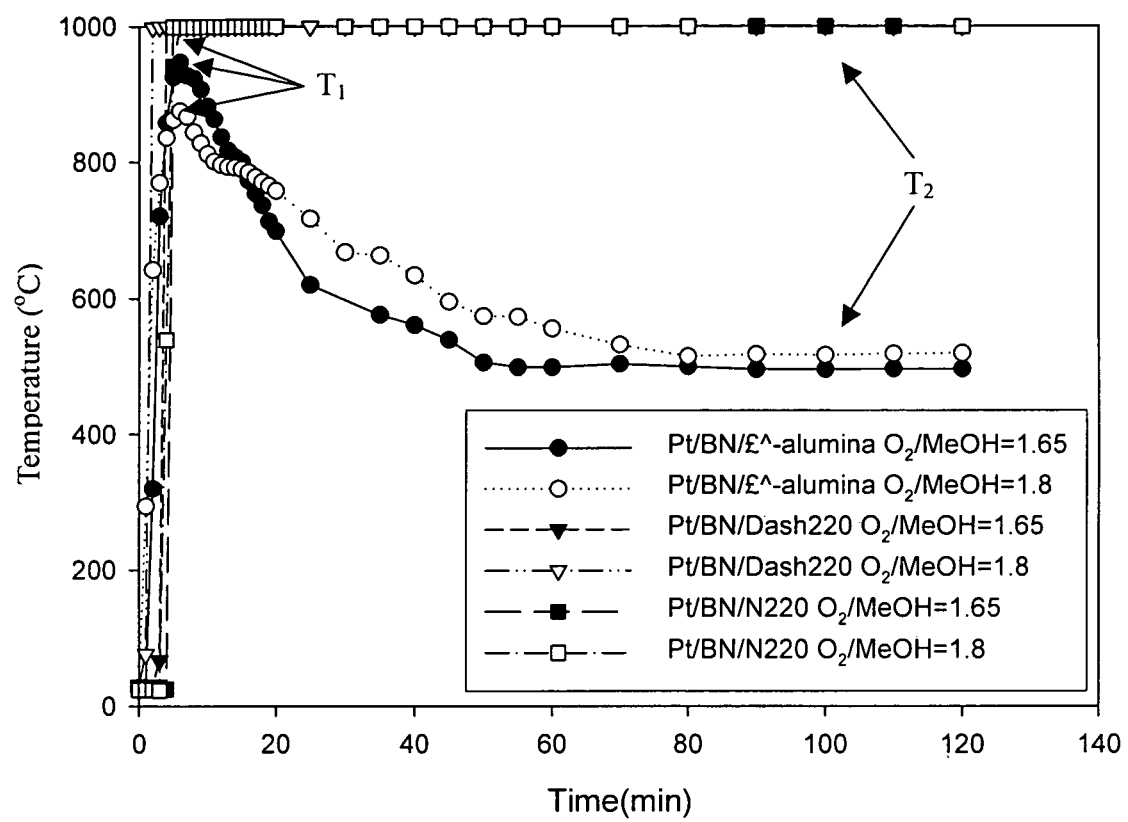
FIG. 2 is a temperature profile showing a catalytic combustion of methanol using various oxidation catalysts and oxygen/methanol ratios with space velocity, $SV=3.2\ hr^{-1}$ to start from the room temperature, wherein $T_1$ represents the temperature at the peak and $T_2$ represents the temperature at the steady.

In this series of tests, 6 g of supported Pt/BN catalyst shown in Example 2 (1 g of Pt/BN on 5 g of support) were filled in a stainless steel tubular reactor of 10 mmID×250 mmL placed in an insulated oven without any external heating facility, as shown in FIG. 1. An appropriate amount of liquid methanol corresponding to the required SV of methanol was injected through a metering pump and air was fed upstream with the methanol at room temperature. The reaction temperature surged up rapidly from room temperature to a peak temperature, $T_1$, over 800° C. within 3 to 6 min and then maintained at a steady temperature, $T_2$ of 450° C. to 1000° C. depending upon the nature of the support and the value of SV. Three catalysts were made using γ-alumina and two commercial Pt/alumina oxidation catalysts, N220 and Dash-220 of Süd Chemie Catalysts Japan, Inc and N.E. Chemtac Corp. of Japan, respectively, as the support for Pt/BN and were tested for their temperature rise in the catalytic combustion of methanol. The results of these catalytic combustion reactions are shown in FIG. 2, Table 2 and Table 3 for $T_1$ and $T_2$.

TABLE 2

Catalytic combustion of methanol with WHSV = 2.4[#]

| Catalysts at $O_2$/$CH_3OH$= | $T_1$ (° C.) | $T_2$ (° C.) | Time to $T_1$ (min) |
|---|---|---|---|
| Pt/BN/g-Alumina | 1.65 | 800 | 443 | 6 |
| Pt/BN/g-Alumina | 1.80 | 811 | 485 | 6 |
| Pt/BN/DASH220 | 1.65 | >1000 | 886 | 5 |
| Pt/BN/DASH220 | 1.80 | >1000 | 945 | 3 |
| Pt/BN/N220 | 1.65 | >1000 | >1000 | 4 |
| Pt/BN/N220 | 1.80 | >1000 | >1000 | 3 |

[#]These catalytic reactions were started from room temperature

TABLE 3

Catalytic combustion of methanol with WHSV = 3.2[#]

| Catalysts at $O_2$/$CH_3OH$= | $T_1$ (° C.) | $T_2$ (° C.) | Time to $T_1$ (min) |
|---|---|---|---|
| Pt/BN/g-Alumina | 1.65 | 947 | 500 | 6 |
| Pt/BN/g-Alumina | 1.80 | 875 | 550 | 6 |
| Pt/BN/DASH220 | 1.65 | >1000 | >1000 | 4 |
| Pt/BN/DASH220 | 1.80 | >1000 | >1000 | 3 |
| Pt/BN/N220 | 1.65 | >1000 | >1000 | 6 |
| Pt/BN/N220 | 1.80 | >1000 | >1000 | 5 |

[#]These catalytic reactions were started from room temperature

Example 6

The Effect of h-BN and Support on the Onset Temperature of Oxidation Catalyst

The cold start capability of those catalysts in EXAMPLE 3 during the onset period is further shown in Table 4 under a lower input of methanol feed, WHSV=1.6 having methanol feed of 0.2 cc/min. Since the onset data shown in FIG. 2 of the original specification is too fast and too crowded to be illustrated, we provide the detailed digital data of this period in the following Table 4 for showing the obvious improvements of the present application. The oxidation reactions of six catalysts in Table 4 were initiated by the same reaction condition of EXAMPLE 5 of the present specification. The temperature rise the very beginning was carefully recorded as shown in Table 4.

TABLE 4

The effects of the h-BN and supporting mateirals on the onset temperature of the combustion catalysts.

| | | | Cat. | | |
|---|---|---|---|---|---|
| min | Dash-220 | N-220 | PtBN | PtBN/ Dash-220 | PtBN/ N-220 | PtBN/ Al$_2$O$_3$ |
| | | | Deg- C. Onset temperature, ° C. | | |
| 0 | 23 | 24 | 24 | 26 | 29 | 28 |
| 1 | 23 | 24 | 24 | 26 | 29 | 28 |
| 2 | 23 | 24 | 24 | 26 | 30 | 28 |
| 3 | 23 | 24 | 25 | 370 | 31 | 298 |
| 4 | 23 | 24 | 25 | 479 | 31 | 406 |
| 5 | 24 | 24 | 26 | 762 | 32 | 490 |
| 6 | 24 | 33 | 26 | 820 | 32 | 529 |
| 7 | 80 | 263 | 26 | 894 | 475 | 547 |
| 8 | 150 | 302 | 27 | 900 | 770 | 571 |
| 9 | 500 | 302 | 27 | 904 | 793 | 576 |

Conditions: O$_2$/CH$_3$OH; CH$_3$OH at 0.2 cc/min with WHSV = 1.6 at atmospheric pressure.

Example 7

Catalytic Combustion of n-hexane with Pt/BN-N-220

Figure 3:
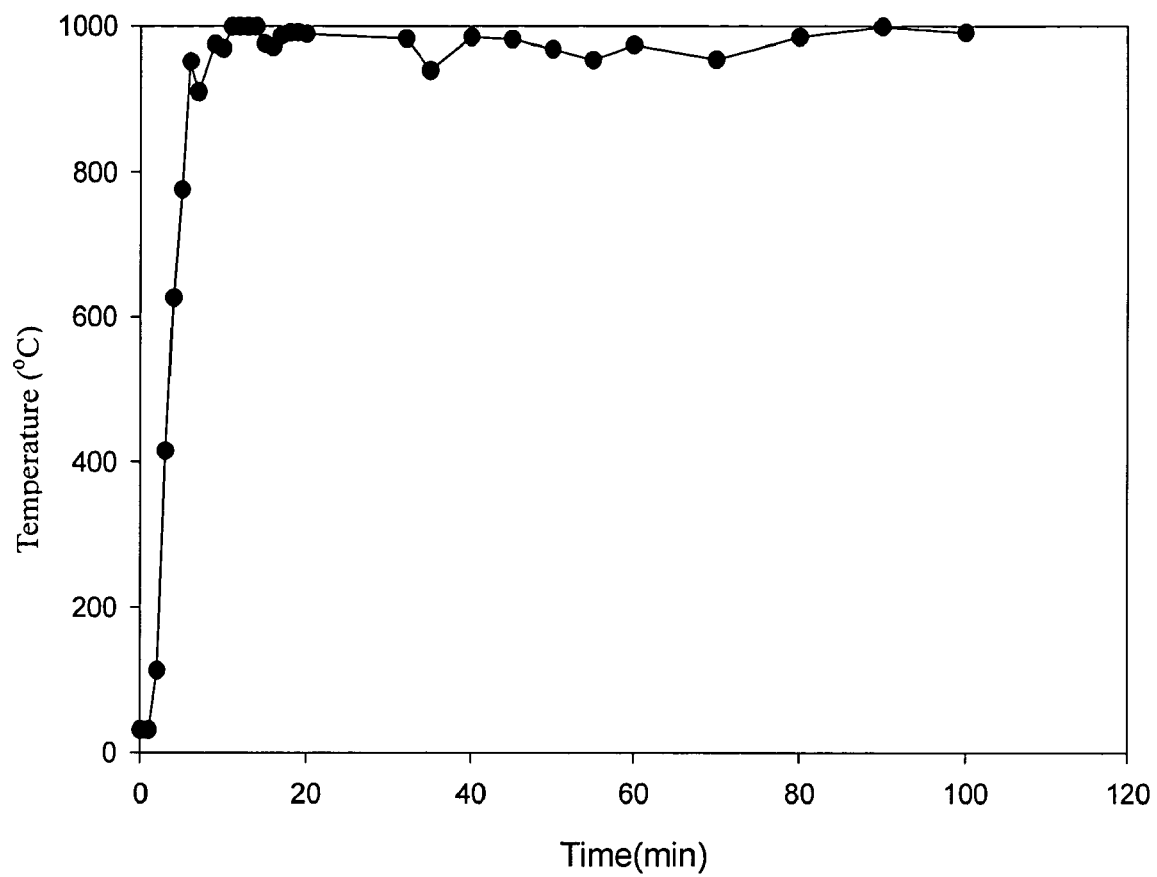
FIG. 3 is a temperature profile showing a catalytic combustion of n-hexane with Pt/BN/N-220, wherein a ratio of $O_2$/n-Hexane is 10.45, according to the present invention.

With an O$_2$/n-Hexane=10.45 (10% exceed the theoretical oxygen demand from the air), n-hexane 9.96 gm/hr was fed at room temperature onto 6 g of Pt/BN-N-220 catalyst which was made as shown in Example 2 with a space velocity of WHSV=1.66. The reaction temperature rose to 850° C. in 6 min and 999 in 10 min and maintained at a steady temperature of 980-970° C. The temperature profile of catalyst zone is shown in FIG. 3.

Example 8

Catalytic Combustion of Fuel to Start Up a Steam Reforming Reaction

Figure 4:
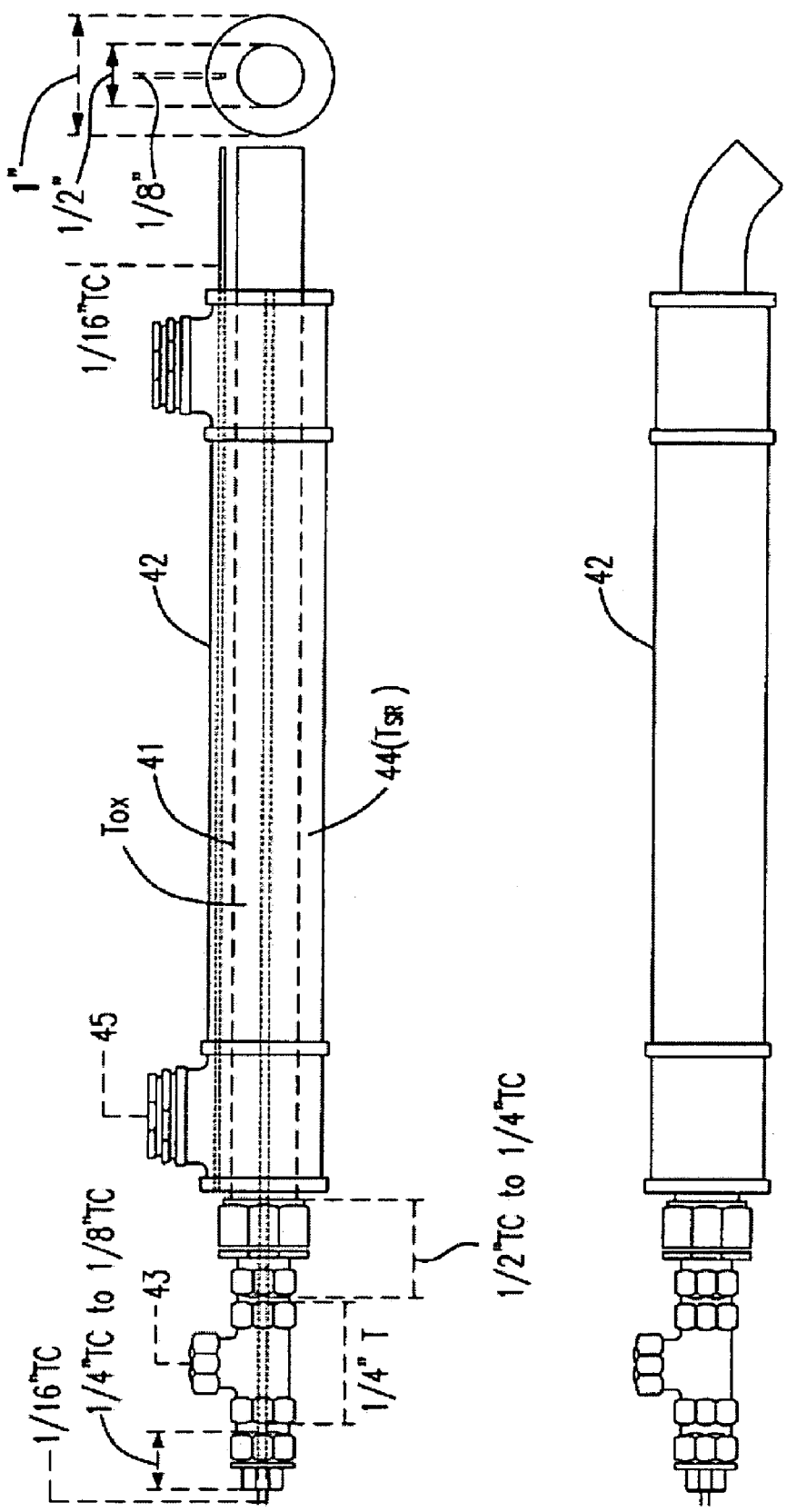
FIG. 4 is a schematic view showing a double jacket stainless steel reactor for the catalytic combustion of methanol fuel to initiate a steam reforming reaction of methanol according to the present invention.

In a double jacket stainless steel reactor, as shown in FIG. 4, the reactor is composed of an inner tube 41 (13 mm in outer diameter×300 mm in length) containing 12 gm of Pt/BN-γ-Al$_2$O$_3$ and a jacket 42 (25 mm in inner diameter×32 mm in length) containing 160 g of CuOZnO catalyst (G-66B of Süd Chemie Catalyst Japan, Inc). The reactor was wrapped with the mineral wool for insulation (not shown). Both the inner reactor and the jacket reactor were independently connected with delivery pumps (not shown) for feeding combustion fuel and raw material to the reformer, respectively. Methanol fuel, 7.5 mmol/min or WHSV=2.4, was firstly injected into the combustion catalyst zone through an inlet 43 for oxidation and then, within 12 minutes, the bed temperature, $T_{OX}$, rose to 560° C. while the temperature in the steam reforming zone 44, $T_{SR}$, shoot up to 360° C. simultaneously. The steam reforming reaction of methanol was set on with the injection of raw material mixture, 7.5 mmol/min of methanol and 9 mmol/min of water, hydrogen and carbon dioxide mixture evolved from the side tube 45. After maintaining steady for another 60 min, the methanol fuel for catalytic combustion was changed to the same aqueous methanol mixture, MeOH (6.7 mmol/min) and H$_2$O (8 mmol/min), and immediately $T_{OX}$ and $T_{SR}$ dropped to 460° C. and 310° C., respectively. The reaction is allowed to continue for another 40 minutes smoothly before shut down.

Example 9

Life Time Test of Catalytic Combustion with Pt/BN/Al$_2$O$_3$

Figure 5:
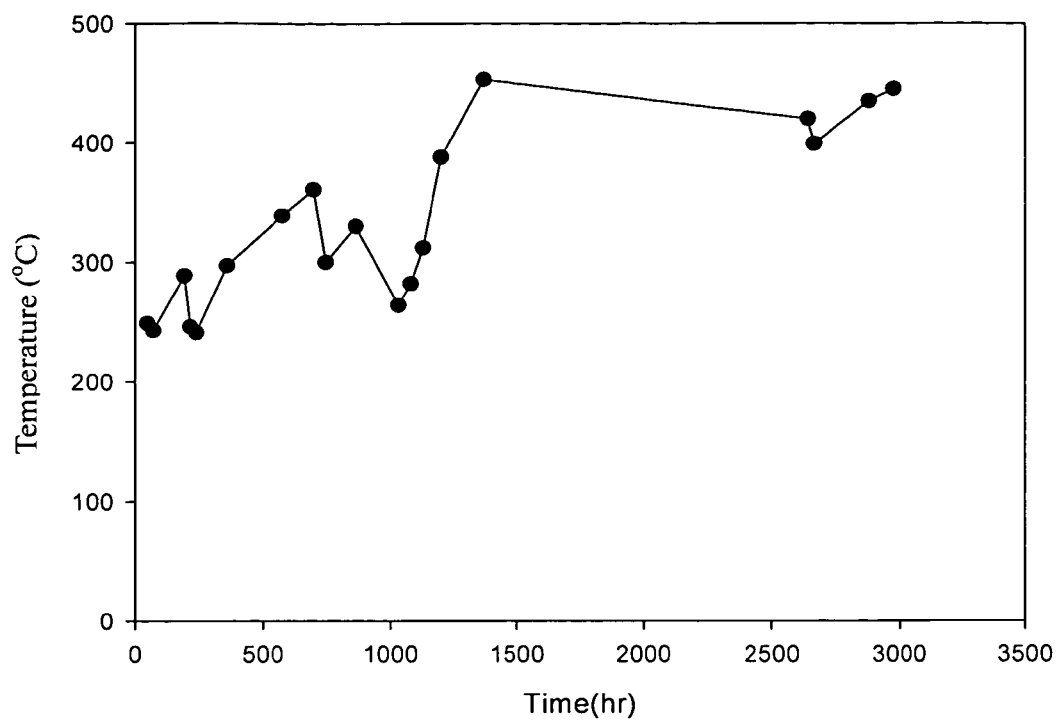
FIG. 5 is a temperature profile of a 10 hours duration test showing a catalytic combustion with a catalyst of PtBN/N220, MeOH=0.4 mL/min, Air=2 L/min, SV=3.2 hr$^{-1}$, $O_2/C$=1.65 to start from room temperature after 10 hours on stream operation, wherein $T_1$ represents the temperature at the peak and $T_2$ represents the temperature at the steady.

In this experiment, a catalytic combustion with 6 g of 0.18 wt % Pt/BN/Al$_2$O$_3$ in an insulated tube reactor. Methanol, 1 L, was placed in a vessel thermostated in a water bath; 875 cc/min of air ws bubble through the methano reservoir to carry the methanol vapor into the tubular reactor. Supplemental air, 625 cc/min was added together into the above methanol-air stream to make O/C=1.65. Reaction temperature climbed immediately and was left for duration test; up to this moment it has passed 125 days and is still going on. The result is shown in FIG. 5 wherein $T_1$ represents the temperature at the peak and $T_2$ represents the temperature at the steady.

Example 10

The Effect of hBN on the Platinum Oxidation Catalyst Through Duration Tests

As shown in the following Table 5, both Dash-220 and N-220 were coated with PtBN on the surface areas and each was subjected to 8 series of the sequential cold start experiments starting from WHSV=1.6 and O$_2$/CH$_3$OH=1.65 for 120 min after being cooled down to the room temperature. After that, the same catalyst was tested for the cold start with O$_2$/CH$_3$OH=1.80. After this treatment of WHSV=2.4 and O$_2$/CH$_3$OH=1.65 was tested until finally at WHSV=4.0 and O$_2$/CH$_3$OH=1.80. The results are tabulated in Table 5. Furthermore, the relevant BET surface areas of those catalysts prior to and after the test series were analyzed and shown in the following Table 6.

TABLE 5

Duration tests of h-BN on the platinum catalysts.

| | | | Onset temperature, ° C. | | | |
|---|---|---|---|---|---|---|
| Sequence | WHSV hr$^{-1}$ | O$_2$/C mole | Dash-220 | PtBN/ Dash | N-220 | PtBN/ N220 |
| 1 | 1.6 | 1.65 | 554 | 577 | 825 | 589 |
| 2 | | 1.80 | 844 | 724 | 763 | 701 |
| 3 | 2.4 | 1.65 | 761 | 890 | 981 | 997 |
| 4 | | 1.80 | 815 | 945 | 837 | 999↑ |
| 5 | 3.2 | 1.65 | 874 | 999↑ | 999↑ | 999↑ |
| 6 | | 1.80 | 912 | 999↑ | 999↑ | 999↑ |
| 7 | 4.0 | 1.65 | 921 | 999↑ | 999↑ | 507 |
| 8 | | 1.80 | 10# | 999↑ | 11# | 713 |

Temperature drop due to the chilling effect of the methanol evaporation when the catalyst failed to initiate the combustion reaction.

TABLE 6

Change of catalyst properties before and after 14 hours of combustion reaction.

| Catalysts | Before Reaction | | | After Reaction | | |
|---|---|---|---|---|---|---|
| | BET Area ($m^2$/gm) | Pore Vol. (c.c./gm) | Pore Size (Å) | BET Area ($m^2$/gm) | Pore Vol. (c.c./gm) | Pore Size (Å) |
| Dash-220 | 149.45 | 0.44 | 118.85 | 96.17 | 0.32 | 131.64 |
| Pt/BN/Dash220 | 135.45 | 0.38 | 112.08 | 85.51 | 0.34 | 160.71 |
| N-220 | 165.96 | 0.42 | 103.52 | 107.98 | 0.38 | 142.63 |
| Pt/BN/N220 | 126.47 | 0.37 | 117.43 | 99.95 | 0.36 | 142.12 |

: Only tested for 14 hrs instead of 31 hrs for the other two catalysts.

Example 11

Combustion Test of the Hydrogen Mixture

Figure 6:
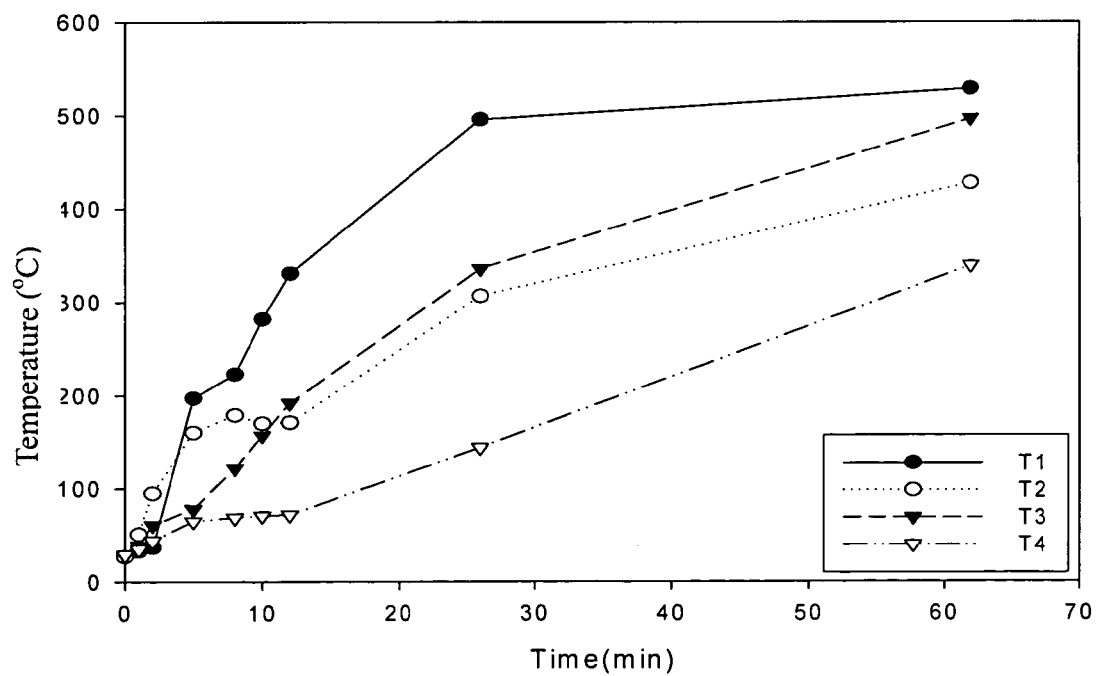
FIG. 6 is a temperature profile of a 70-minute duration test showing a catalytic combustion having an air (6.6 L/min) and $H_2/CO_2$ (4.8 L/min in 50/50 ratio) mixture with an $O_2/H_2$ molar ratio of 0.577 to start from room temperature, wherein $T_1$ to $T_4$ respectively represent the temperatures of the different four positions of the reactor.

In a column reactor of 1 inch in outer diameter×300 mm in length, 150 g of 0.037% PtBN/alumina was placed therein and the reactor was insulated with 25 mm thick Ceramic fiber wool (Isowool PAV-126 of Isolite Fanshin (Taiwan) Co., Ltd k=0.10 Kcal/M-hr). The top of the reactor was open to air so as to make the heat loss in the top section. Four thermal couples were inserted at the bottom, ¼, ½ and ¾ of the reactor length to monitor the temperature profile along the reactor. Air (6.6 L/min) and $H_2/CO_2$ mixture (4.8 L/min in 50/50 ratio) with an $O_2H_2$ molar ratio of 0.577 (15.5% excess) were fed through the bottom inlet of the reactor at the room temperature. The reactor temperature rose rapidly to 300° C. and 500° C. in 10 min and 25 min, respectively, as shown in FIG. 6, which shows the test result of the hydrogen combustion with 0.037% PtBN/alumina, wherein $T_1$ to $T_4$ respectively represent the temperatures of the different four positions of the reactor.

Example 12

Combustion Test of the Methane

Figure 7:
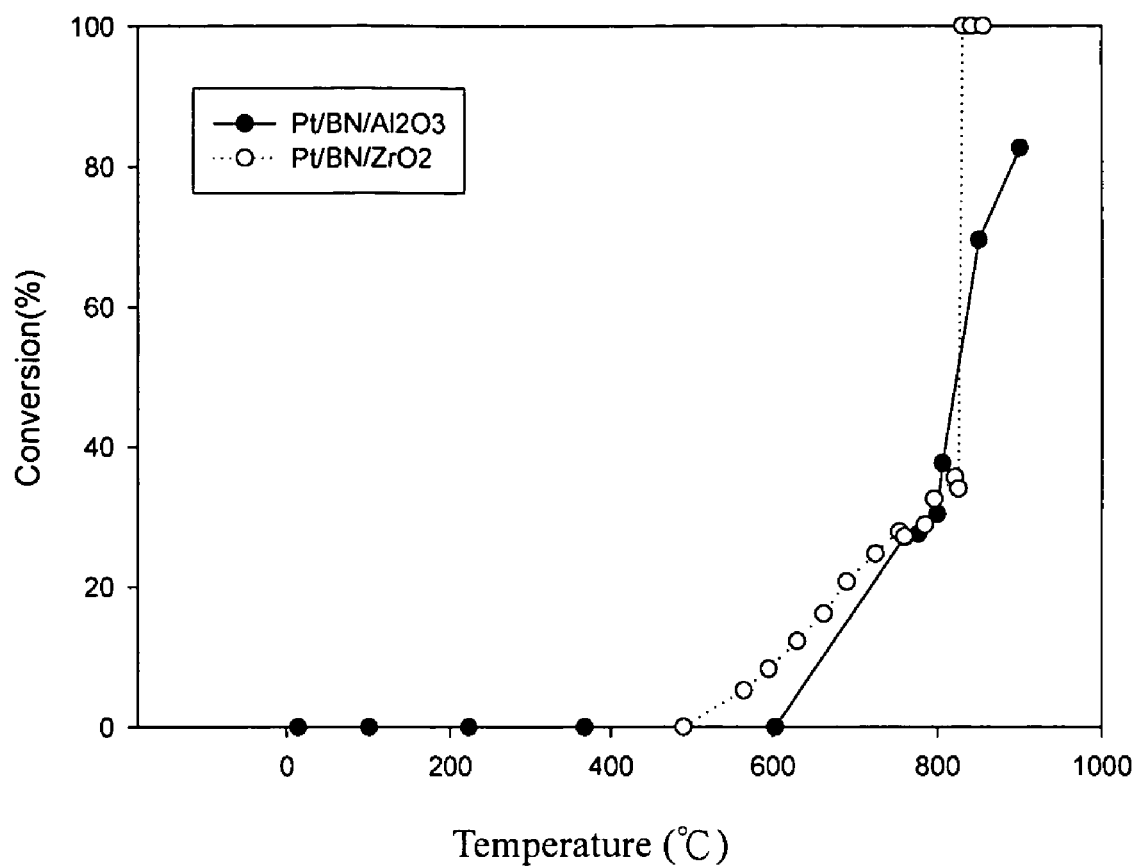
FIG. 7 is the result of the combustion test of the methane.

Combustion test of methane, 50% with helium, was tested in a reactor of 12.5 mm OD×200 mm in length. Methane mixture gas was not oxidized as readily as hydrogen or methanol. Methane mixture was, therefore, introduced into the reactor at a certain temperature; the conversion levels at the pre-set temperatures were calculated from the online GC analysis of the reaction product. Two catalysts with 0.18% Pt in weight on different supports, alumina and zirconia A, PtBN/alumina in 8-16 mesh size and B,PtBN/$ZrO_2$ of Example 3 were tested; the test conditions were $CH_4$, 1.5%, through 3 cc of catalyst with VHSV=20,000 $hr^{-1}$ and $O_2/CH_4$=14.7 The combustion was sluggish until the catalyst bed was heated to about 800° C.; thereafter, the combustion took off rapidly. The B-catalyst has a clear cut of light-off temperature at 800° C. and completes the combustion immediately whereas the A-catalyst has slower progress in combustion and incompletes. The results are shown in FIG. 7.

In U.S. Pat. No. 6,048,512, a supported platinum catalyst was used for the synthesis of the hydrogen cyanide through a dehydrogenation of the methane and ammonia with the catalyst containing a particular platinum group metal, particularly platinum, and metal nitrides as the active catalytic components on a refractory support. In other words, the metal nitrides themselves are the active components of the reaction in U.S. Pat. No. 6,048,512. In addition, U.S. Pat. No. 6,048,512 was an improvement of the prior art in which the active metal nitride was formed in-situ in a lengthy induction period prior to the introduction of methane in its conversion to hydrogen cyanide. The use of the prepared metal nitride, such as aluminum nitride, is intended for shortening this lengthy period of the induction time to form the metal nitride and to reduce the carbon black soot formed during this induction reaction. Nevertheless, since the present application relates to the catalytic combustion, it is very much different from other catalytic reactions, such as the selective oxidation, the synthetic reaction and the selective chemisorption for gas detecting.

In a catalytic combustion, the complete oxidation is the key to yield maximum heat from the formation of the final products of the carbon dioxides and steams and the selectivity to intermediate is not the major concern of the combustion. During the combustion, tremendous amount of heat is released and a heavy demand of the thermal stability of the catalyst is desired, but they are not the major concerns in the design of a catalyst for an endothermic reaction, such as that in the cited reference, U.S. Pat. No. 6,048,512. A catalytic combustion reaction tends to bring about hot spots on the catalyst surfaces and may make active components to sinter and lost their reactivity. Therefore, in a combustion reaction, the catalyst has to withstand severe evolution of heat by having the active component such as platinum, well dispersed on a stable support, and, if possible, has to own a thermal conductive promoter capable of dispersing the exothermic heat away from the active centers as soon as possible. Nevertheless, in a catalytic combustion, two features of the catalysts are particularly desired, i.e. the high reactivity for cold start and the resistance to huge amount of reaction heat for thermal stability. In which, as demonstrated in the disclosures for Pt/BN vs. PtBN/Al2O3 in Table 4 of the present specification, since the cited catalyst according to the present application includes the dispersion of the active catalytic component onto a support, the active catalyst certainly has a greater opportunity to be contacted with the reactants and the relevant reactivity is really increased accordingly.

In addition, as demonstrated in the disclosures for Dash-220 or N-220 vs. PtBN/Dash220 or PtBN/N220 in Table 4 of the present application, all these four catalysts are basically alumina supported platinum catalyst, wherein the latter two catalysts have a h-BN coating surrounding the platinum catalyst on the alumina supports. In the latter two catalysts, the heat evolved from the active platinum catalyst is spread first to the immediate surrounding of h-BN and then is conducted to a wider area and then to a larger fraction of the alumina. Nevertheless, since the former two catalysts do not have the h-BN on the platinum catalysts, the heat from the platinum would be concentrated at the immediate vicinity of the alumina, which is not a good thermal conductor. As shown in Table 4 of the present application, it's clearly seen that a faster surge of the reaction temperature is resulting from those catalysts having the incorporated h-BN.

Furthermore, the h-BN of the present application is used for dispersing the exothermic heat of the combustion reaction and helpful to expel the steam molecule from the platinum sites as soon as it is formed at the sites during the reaction. The effects of h-BN on the temperature surges during the onset periods are easily obtained by comparing the two pairs of experiments, DASH vs. PtBN/DASH and N220 vs. PtBN/N220 in Table 4 of the present application, and, as shown in Table 4 of the present application, the effects of h-BN on the surges of combustion temperatures are really apparent.

As shown in Table 5 of the present application, the h-BN-incorporated catalysts, i.e. PtBN/DASH and PtBN/N220, are able to be cold started each time throughout the 8 tests, but their parent catalysts, i.e. DASH-220 and N-220, fail to be started up with the reaction at the last run. This is attributed to the sintering of the parent catalysts as shown by the decrease of their surface areas. In other words, clearly, the addition of h-BN to the conventional alumina supported platinum catalysts makes these catalysts more resistant to the severe thermal deterioration from a combustion due to the fact that the h-BN coating helps conduct the exothermic heat of platinum catalyst to a wider area and then to a larger faction of the support to act as a heat sink. This avoids hot pot formation by alleviating the concentration of heat at a small spot.

As above, since the reaction in the present application is an exothermic combustion rather than an endothermic reaction (U.S. Pat. No. 6,048,512) and the metal nitrides in the U.S. Pat. No. 6,048,512 are used as the active components themselves rather than those just used as the catalytic agents in the present application, it's impossible for one skilled in the art to achieve the present application (an exothermic combustion) according to the disclosures of the U.S. Pat. No. 6,048,512 or the implication and techniques thereof.

Furthermore, in Japanese Patent No. 54-009694, a platinum electrode was prepared by coating a platinum paste on the quartz glass or stainless steel support. The paste was prepared by suspending metallic platinum powder in hosts of solvents, such as terpene oil, ethyl cellulose and surfactant. The oxidation catalyst paste was prepared from suspending the alumina, hydrated alumina and unknown amount of h-BN in water, polyethylene glycol and surfactant and then drying them. It is known that h-BN is hygroscopic and is not soluble in water. Therefore, the quantity and the role of h-BN in JP 54-009694 are not clear. In addition, since JP 54-009694 relates to the gas sensor detecting the trace amount of a particular gas, such as methane, the operation temperature is room temperature and the evolution of chemisorption or reaction heat is never severe because of the limited concentration of the gas to be detected. Therefore, thermal stability of the catalyst is never a major concerned subject. Nevertheless, since the operation temperatures of the present application could be approximately one thousand degree of Celsius and the operation temperature of JP 54-009694 is just normal room temperature, it's impossible for one skilled in the art to achieve the present application according to the disclosures of the U.S. Pat. No. 6,048,512 or the implication and techniques thereof.

Additionally, in U.S. Pat. No. 6,048,512, the coating paste involves, like that of Japanese patent, a large volume of toluene (620 ml) together with the additional co-solvents of Degalan, Aerosil and PEPS for dispersing the boron nitride. The preparation of this suspension is cumbersome and complicate.

Based on at least above reasons, the present invention has many features never shown, taught or suggested in U.S. Pat. No. 6,048,512, and JP 54-009694, so that the present invention cannot be anticipated by them and further cannot be achieved by one skilled in the art from the teachings thereof.

Finally, the substance for catalytic combustion claimed in present invention can not be conceived and achieved even by combining U.S. Pat. No. 6,048,512 and JP 54-009694.

In addition, it should be noted that the catalyst provided in the present application is ably applicable in the vapor combustion system, the jet engine, the boiler and the cleaning process of the volatile organic chemicals. Furthermore, the boron nitride in the above embodiments could not be replaced by a ceramic nitride and a metal nitride.

In view of afore said, the catalytic combustion according to the present invention can easily achieve a desired high temperature within a very short time and maintain at a steady temperature for a long time. Furthermore, the fuel does not need to be preheated for shortening the initiating time, namely, the fuel can start at room temperature. Moreover, as shown in EXAMPLE 5, the desired reaction temperature or the steady temperature, $T_2$, can be controlled by choosing proper catalyst, space time, WHSV, and oxygen/methanol ratio. Therefore, through these features described above, the present invention can be easily employed for supplying the heat to an industrial reactor or facilities.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for fabricating a substance for a catalytic combustion, the method comprising:
   providing a salt precursor of a noble metal;
   providing a h-boron nitride as an inorganic combustion promoter;
   mixing the salt precursor of the noble metal and the h-boron nitride with a solvent to form a paste;
   dispersing the paste on a supporting material; and
   drying and calcining the supporting material with the paste to form the substance.

2. The method according to claim 1, wherein providing the salt precursor of the noble metal comprises providing the salt precursor of one selected from the group consisting of platinum (Pt), palladium (Pd), rhodium (Rh), Ruthenium (Ru) and a mixture thereof.

3. The method according to claim 1, wherein dispersing the paste on the supporting material comprises dispersing the paste on a porous material for facilitating the catalyst combustion.

4. The method according to claim 1, wherein dispersing the paste on the supporting material comprises dispersing the paste on one selected from the group consisting of alumina, titania, zirconia, silica, and industrial oxidation catalysts.

5. The method according to claim 1, wherein mixing the salt precursor of the noble metal and the h-boron nitride is with a solvent selected from the group consisting of a methanol, a dimethyl formamide and a combination thereof.

6. The substance fabricated by the method according to claim 1.

7. A substance for a catalytic combustion fabricated by a method comprising:

providing a salt precursor of a noble metal;

providing a h-boron nitride as an inorganic combustion promoter;

mixing the salt precursor of the noble metal and the h-boron nitride with a solvent to form a paste;

dispersing the paste on a supporting material; and drying and calcining the supporting material with the paste to form the substance.

8. The substance according to claim 7, wherein the salt precursor is one of a chloride and an amine salts of the noble metal.

9. The substance according to claim 7, wherein the solvent is one selected from the group consisting of a methanol, a dimethyl formamide and a combination thereof.

10. The substance according to claim 7, wherein a specific surface area of the substance is ranged from 1 to 200 $m^2/g$.

11. The substance according to claim 7, wherein a loading of the noble metal to the substance is ranged from 0.01% to 5.0% by weight.

12. A method for catalyzing a combustion reaction, comprising:

providing the substance according to claim 7 in a reactor;

providing a fuel in the reactor;

providing an air in the reactor;

generating a temperature in said reactor ranged from 5° C. to 1000° C.; and causing the fuel and the air to undergo the combustion reaction in a catalysis of the substance.

13. The method according to claim 12, wherein providing the fuel comprises providing one selected from the group consisting of hydrogen, a mixture of water and alcohol and a single alcohol.

14. The method according to claim 13, wherein providing the alcohol comprises providing one selected from the group consisting of a methanol, an ethanol and an isopropanol.

15. The method according to claim 12, wherein providing the fuel comprises providing one of a mixture of hydrocarbon and alcohol and a single hydrocarbon.

16. The method according to claim 15, wherein providing the hydrocarbon comprises providing one selected from the group consisting of a methane, a liquid petroleum gas (LPG), a gasoline, a hexane and a naphtha oil.

17. The method according to claim 12, wherein the combustion reaction is initiated within 30 minutes after providing the substance, the fuel and the air into the reactor.

* * * * *